(12) United States Patent
Campbell et al.

(10) Patent No.: US 7,363,202 B2
(45) Date of Patent: Apr. 22, 2008

(54) STATE EXPLORATION USING MULTIPLE STATE GROUPINGS

(75) Inventors: Colin L. Campbell, Seattle, WA (US); Lev Borisovich Nachmanson, Redmond, WA (US); Margus Veanes, Bellevue, WA (US); Wolfgang Grieskamp, Redmond, WA (US); Wolfram Schulte, Bellevue, WA (US); Nikolai Tillmann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/040,187

(22) Filed: Jan. 20, 2005

(65) Prior Publication Data

US 2006/0161404 A1      Jul. 20, 2006

(51) Int. Cl.
*G06F 17/10*     (2006.01)
(52) U.S. Cl. .............................................. 703/2; 716/4
(58) Field of Classification Search ............... 703/2; 382/232; 716/4
See application file for complete search history.

(56) References Cited

U.S. PATENT DOCUMENTS

| | | | | |
|---|---|---|---|---|
| 5,999,717 A | * | 12/1999 | Kaufmann et al. ............ | 703/2 |
| 6,738,955 B2 | * | 5/2004 | Andersen et al. .............. | 716/4 |
| 7,088,864 B2 | | 8/2006 | Grieskamp et al. | |
| 2005/0050391 A1 | | 3/2005 | Grieskamp et al. | |
| 2005/0160404 A1 | | 7/2005 | Nachmanson et al. | |
| 2005/0198621 A1 | | 9/2005 | Tillmann et al. | |
| 2006/0179383 A1 | | 8/2006 | Blass et al. | |

OTHER PUBLICATIONS

Friedman et al., G. Projected State Machine Coverage for Software Testing, ACM SIGSOFT Software Engineering Notes, Proceedings of the 2002 ACM SIGSOFT International Symposium on Software Testing and Analysis ISSTA '02, Jul. 2002, pp. 134-143.*
Owen et al., D. An Alternative to Model Checking: Verification by Random Search of AND-OR Graphs Representing Finite-State Models, 7th IEEE International Symposium on High Assurance Systems Engineering, Oct. 2002, pp. 119-126.*
Hong et al., Y. Symbolic Reachability Analysis of Large Finite State Machines Using Don't Cares, IEEE, Design, Automation and Test in Europe Conference and Exhibition, Mar. 1999, pp. 13-19.*
Barnett et al., "The Spec# Programming System: An Overview," in M. Huisman, editor, *Cassis International Workshop*, LNCS, Springer, 21 pages, 2004.
Barnett et al., "Verification of object-oriented programs with invariants," in *Journal of Object Technology*, vol. 3, No. 6, 30 pages, Jun. 2004.

(Continued)

*Primary Examiner*—Russell Frejd
(74) *Attorney, Agent, or Firm*—Klarquist Sparkman, LLP

(57) ABSTRACT

Exploration algorithms are relevant to the industrial practice of generating test cases from an abstract state machine whose runs define the predicted behavior of the software system under test. Here, a new exploration algorithm allows multiple state groupings to simultaneously guide the search for states that are interesting or relevant for testing. In some cases, the algorithm allows exploration to be optimized from exponential to linear complexity. An extended example is included that illustrates the use of the algorithm.

17 Claims, 10 Drawing Sheets

OTHER PUBLICATIONS

Blass, et al., "Play to Test," Microsoft Technical Report, MSR-TR-2005-04, 26 pages, 2005.

Campbell, et al., "Model-Based Testing of Object-Oriented Reactive Systems with Spec Explorer," Technical Report MSR-TR-2005-59, 35 pages, May 2005.

Campbell, et al., "State Exploration with Multiple State Groupings," in D. Beauquier, E. Börger, and A. Slissenko, editors, *12th International Workshop on Abstract State Machines, ASM '05*, pp. 119-130, Mar. 2005.

De Alfaro, "Game Models for Open Systems," in *Proceedings of the International Symposium on Verification (Theory in Practice)*, vol. 2772 of Lect. Notes in Comp. Sci. Springer-Verlag, pp. 269-289, 2003.

Glässer, et al., "Abstract Communication Model for Distributed Systems," in *IEEE Transactions on Software Engineering*, vol. 30, No. 7, pp. 458-472, Jul. 2004.

Grieskamp, et al., "Generating Finite State Machines from Abstract State Machines," in *Proceedings of the International Symposium on Software Testing and Analysis (ISSTA)*, vol. 27, pp. 112-122, Jul. 2002.

Grieskamp, et al., "Instrumenting scenarios in a model-driven development environment," *Information and Software Technology*, vol. 46, No. 15, pp. 1027-1036, Dec. 2004.

Gurevich et al., "AsmL: The Abstract State State Machine Language," white paper, 51 pages, Nov. 2001.

Gurevich, "Evolving Algebras 1993: Lipari Guide," in *Specification and Validation Methods*, E. Börger, ed., Oxford University Press, 26 pages, 1995.

Gurevich, et al., "Semantic Essence of AsmL," Microsoft Technical Report, MSR-TR-2004-27, 54 pages, Jul. 2005.

Hartman, et al., "Model Driven Testing—AGEDIS Architecture Interfaces and Tools," in *1st European Conference on Model Driven Software Engineering*, 11 pages, Dec. 2003.

Jard, et al., "TGV: theory, principles and algorithms," in *The Sixth World Conference on Integrated Design and Process Technology (IDPT'02)*, 10 pages, Jun. 2002.

Kuliamin, et al., "UniTesK: Model Based Testing in Industrial Practice," in *1st European Conference on Model Driven Software Engineering*, 9 pages, Dec. 2003.

Nachmanson, et al., "Optimal Strategies for Testing Nondeterministic Systems," in *ISSTA'04 Software Engineering Notes*, vol. 29, 10 pages, ACM, Jul. 2004.

"Spec Explorer," 3 pages, downloaded from http://research.microsoft.com/specexplorer/ on Jan. 24, 2007.

Tretmans, et al., "TorX: Automated Model Based Testing," in *1st European Conference on Model Driven Software Engineering*, 13 pages, Dec. 2003.

Veanes, et al., "On-The-Fly Testing of Reactive Systems," Microsoft Technical Report MSR-TR-2005-03, 16 pages, Jan. 2005.

Yannakakis, "Testing, Optimization, and Games," In *Proceedings of the Nineteenth Annual IEEE Symposium on Logic In Computer Science, LICS 2004*, 11 pages, IEEE, 2004.

Egon Börger, Angelo Gargantini, Elvinia Riccobene (Eds.): Abstract State Machines, Advances in Theory and Practice, 10th International Workshop, ASM 2003, Taormina, Italy, Mar. 3-7, 2003, Proceedings. *Lecture Notes in Computer Science* 2589 Springer 2003, ISBN 3-540-00624-9.

* cited by examiner

FIG. 4

```
type Prisoner = int; // prisoners are identified by number
enum Mode {
    Initializing,      // prisoners are counting themselves
    Interviewing,      // interviews are happening
    Answered,          // an answer has been given
    Decided            // the outcome of the game has been decided
} var Mode           mode     = Mode.Initializing;    // phase of the protocol
var Set<Prisoner>  prisoners = Set{};               // who are the prisoners?
var bool           signal   = false;                // is the switch "On"?
var Set<Prisoner>  interviewed = Set{};             // who has been interviewed?
var Set<Prisoner>  signalled   = Set{};             // who has signalled?
var Prisoner       nCounted = 0;                    // how many signals seen?
```

FIG. 5

```
int NPrisoners() { return prisoners.Size; }
int NInterviewed() { return interviewed.Size; }
int NSignalled() { return signalled.Size; }
bool IsObserver(Prisoner p) { return (p == 1); }    ◄── 502
bool IsSignaler(Prisoner p) { return (p != 1); }    ◄── 504
bool HasSignaled(Prisoner p) { return (p in signalled); }
```

FIG. 6

```
[Action]
void Start(int n)
    requires n > 1;                           ← 604
    requires mode == Mode.Initializing;       ← 606
{
    prisoners = Set{1..n};                    ← 602
    mode = Mode.Interviewing;                 ← 608
}
```

FIG. 7

```
[Action]
void Interview(Prisoner p)        ← 702
    requires p in prisoners;
    requires mode == Mode.Interviewing;       ← 714
{
    // observer behavior                      710
    if (IsObserver(p) && signal) {            718
        let newCount = nCounted + 1;    // 1) compute the new count
        nCounted = newCount;            // 2) remember the new count
        signal = false;   ← 720         // 3) reset the signal state
        if (newCount == NPrisoners() - 1)
            mode = Mode.Answered;       // 4) give answer if possible
    }
                                  704                  706
    // signaler behavior
    if (IsSignaler(p) && !HasSignaled(p) && !signal) {
        signal = true;   ← 708          // 1) give the signal
        signalled += Set{p};            // 2) remember that signal was given
    }                           716

// warden behavior                  712
    interviewed += Set{p};              // remember that p was interviewed
}
```

```
[Action]
void Finish()
  requires mode == Mode.Answered;
{
  if (interviewed.Size == NPrisoners())   ← 804
    WriteLine("All prisoners are freed.");  ← 802
  else
    WriteLine("All prisoners are executed.");
  mode = Mode.Decided;
}
```

STATE EXPLORATION USING MULTIPLE STATE GROUPINGS

TECHNICAL FIELD

The technical field relates generally to providing testing for a device or software, and more specifically, to providing behavioral coverage of tests by exploring a state space generated with respect to plural selected state groupings.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The behavior and operation of devices may be described using abstract state machines (ASMs). For each action that the device may take, the ASM defines conditions that must be met to effect changes to the state of the device. The conditions may be said to "guard" changes to the device state, and may thus be referred to as guards on the device state. For a more complete description of normalized ASMs, see Y. Gurevich, *Evolving Algebra*, 1993: *Lipari Guide*, and In E. Boerger, *Specification and Validation Methods*, pages 9-36, Oxford University Press, 1995. ASMs have applications beyond describing the behavior and operation of devices. For example, ASMs may describe the behavior and operation of software programs executing on a general purpose computer system.

Each unique combination of state settings, in other words, the values of all variables in the system, represents a state of the device in the ASM. For this reason, ASMs may have a large, even infinite number of states. Languages exist for specifying model programs (i.e., ASML, Spec#, etc.). The term model program refers to the embodiment of an ASM as a finite text written in a computer language. These languages often have supporting analysis tools that will reduce any specified model program into a finite state machine (FSM).

FIG. 1 is a prior art graphical representation of a finite state machine created from a specified model program. Well-known techniques exist for generating test suites from finite state machines (FSMs). FSMs define the behavior of a device in terms of device states and the events that result in state changes. However, due to the very large or infinite number of states of the ASM, it is often impractical to apply to ASMs the techniques used for generating test suites from ESMs. A previous patent application provides a manner of producing an FSM from an ASM (see "Generating a Test Suite from an Abstract State Machine," U.S. Pat. No. 7,088,864, issued Aug. 8, 2006, which is incorporated herein by reference and is hereafter referred to as "GTSASM"), which leads to the application of FSM test suite generation techniques to ASMs. This prior application provides a way of generating test suites from an FSM generated from a model program.

During test case generation from a model program, a finite transition system is produced that encodes interesting or relevant runs of the model program (a process called "FSM generation"), and then the finite transition system is traversed to produce test cases. The finite transition system produced from a model program can also be used to verify the behavior (e.g., inputs, outputs, etc.) of an implementation under test (e.g., device, software, etc.). Although a model program is expressed as a finite text, it typically induces a transition system (an "unwinding" of the model program) with a very large or even infinite state space.

SUMMARY

The described technologies provide methods and systems for allowing a device tester or a program tester to indicate plural state groupings to explore a model program for the purpose of generating tests that verify the behavior of a device or program under test. The following summary describes a few of the features described in the detailed description, but is not intended to summarize the technology.

Methods and systems are provided for exploring state spaces using state groupings. In one such example, a finite transition system is encoded in a process called state machine (FSM) generation. A finite transition system is produced with a very large and possibly infinite state space. States are grouped (e.g., via projections) to capture transitions of interest. A method is provided for generating test cases using state groupings to reduce the number of test cases needed to cover the desired configurations of state variables. In one example, the number of test cases increases linearly with the number of state variables instead of exponentially.

In another example, a computer system includes a user communication component, a state exploration component, and a state space (such as a model program, device states, abstract state machine, finite state machine, program, etc.). The user communication component receives the state space and state groupings. In one example, the state exploration component explores the state space and provides a subset of the state space comprising a transition set T. The state exploration component selects states from a frontier set and returns the output when the frontier set is empty. When a state is selected from the frontier set, if the selected state provides a transition to an unexplored state, and the unexplored state provides a variable-value assignment corresponding to at least one of the received plural state groupings that is not yet presently in a set V, then the unexplored state is added to the frontier set and to set V, and the transition is added to set T. However, when a state is selected from the frontier set and the selected state provides only transitions already explored, then that state is removed from the frontier set. In one example, the subset is used to create a finite state machine that is used to create test suites. Since the subset is generally smaller, the described systems and methods provided a form of directed behavioral coverage in a more scalable format.

Additional features and advantages will be made apparent from the following detailed description, which proceeds with reference to the accompanying drawings.

BRIEF DESCRIPTION OF THE DRAWINGS

FIGS. 4-8 provide a program listing of an exemplary model program used to illustrate state exploration using state groupings.

FIG. 9 is a graphical projection of an exemplary first state grouping.

DETAILED DESCRIPTION

Overview

During exploration of a state space of a model program or of a finite state machine, various methods are provided for reducing the state space while preserving or enhancing the ability of a generated test case to discern behavioral differences.

A prior method introduced a basic approach called hyper-state exploration (see "GTSASM"). In that example, any two states with the same value assignments for a specific set of properties within the two states, were considered indistinguishable, and as such, evaluated to the same hyperstate in a resulting FSM.

One limitation of the GTSASM approach is that state exploration for a specific set of properties may still result in an unfeasibly large number of explored states. For example, this situation arises if a model program has several parts that correspond to logically independent sub-models each of which induces a large state space on its own (e.g., a server and a client). However, a total state space induced by a Cartesian product of the state spaces induced by the separate sub-models often provides a state space too large for practical purposes. Additionally, if a single grouping that captures relevant properties of all the sub-models is utilized, then the generated FSM has a state group for each combination of the values. However, one is typically only interested in coverage for states where the different values of grouping expressions for the different sub-models are present, rather than the combination of all the possible values. To overcome these various limitations, a method is provided for exploring a state space for plural state groupings.

Exemplary Method For State Exploration Using State Groupings

Figure 2:
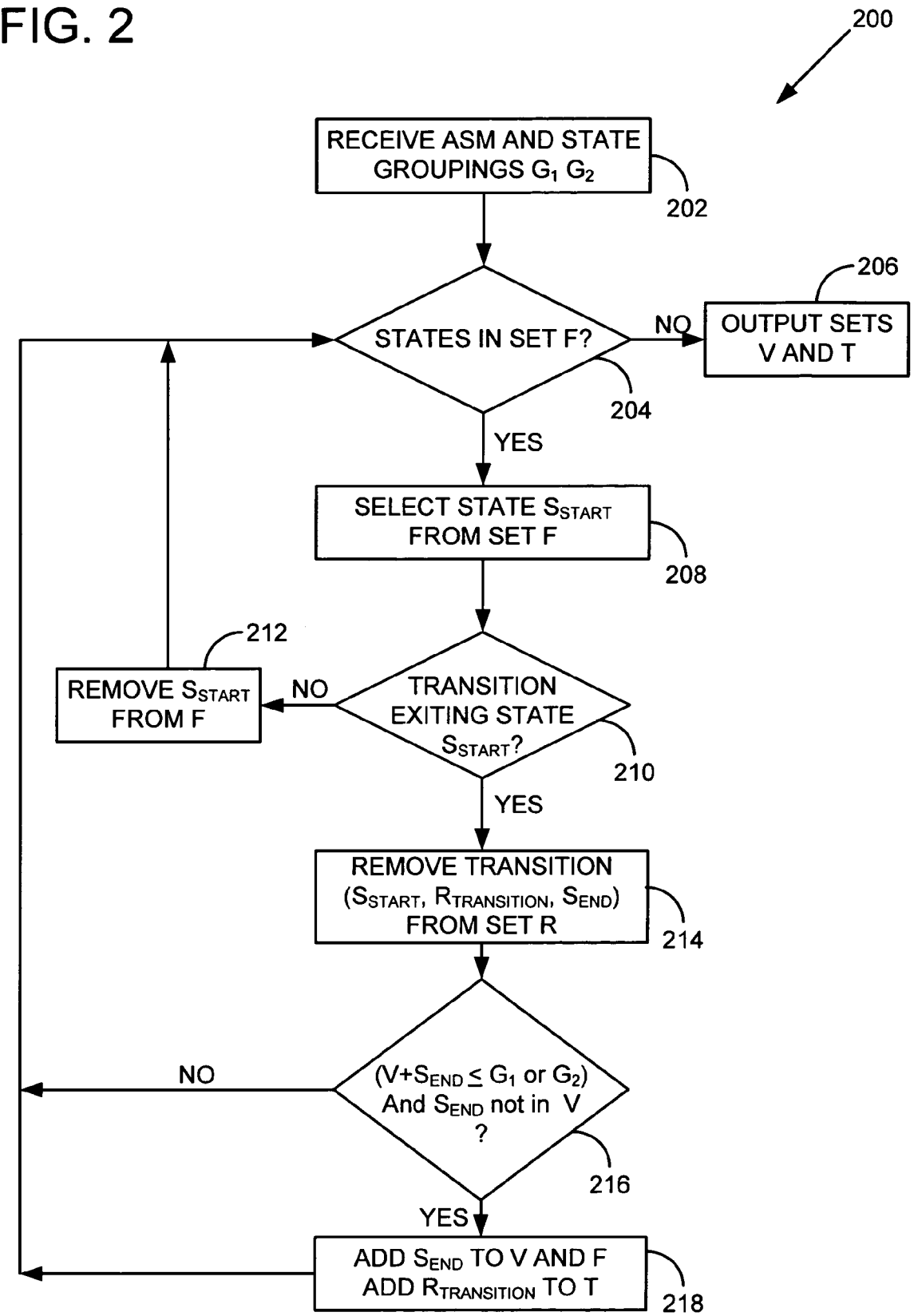
FIG. 2 is a flowchart of an exemplary method for exploring a state space with plural state groupings.

FIG. 2 is a flowchart of an exemplary method for exploring a state space for plural state groupings. The described method can be used with various types of state spaces such as abstract state machines, finite state machines, model programs, devices or programs. In this example, the method is described in the context of receiving an abstract state machine and reducing the abstract state machine to a finite state machine using state exploration of plural state groupings. However, once one of ordinary skill in the art has studied this specification, it will be apparent that this method is not limited to reducing abstract state machines, reducing finite state machines, or reducing model programs to testing sequences. Rather, the methods and systems described herein will be grasped as valuable in any context comprising state explorations of a state space using state groupings to obtain a subset of the state space.

At 202, the method receives an abstract state machine (or ASM), possibly in the form of a model program, and plural state groupings. Although not required, in this example, an ASM comprises plural states comprising various combinations of assignments to five variables (e.g., A, B, C, D, and E). Additionally, the ASM defines a start state $S_0$ and transitions (set R) among ASM states. In one example, the plural state groupings comprise a first state grouping ($G_1$) of a tuple of variables <A, B>, and a second state grouping ($G_2$) of a tuple of variables <D, E>. One possible state exploration of the $G_1$ tuple comprises one or more of the various combinations of value assignments to variables A and B. Similarly, one state exploration of the $G_2$ tuple comprises one or more of the various combinations of value assignments to variables D and E. Set F and set V are initialized to contain state $S_0$; set T is initially empty.

At 204, the method determines whether any states remain in set F for state exploration. If states remain for exploration, the method continues at step 208. When no states remain in set F for selection, the method exits 206. When the method exits 206, sets V and T comprise one example representation of state exploration via state groupings. In this example, set V comprises states of an output finite state machine while set T comprises the transitions of the output finite state machine. Set V and T can comprise one or more data structures. Set V may be derived from set T. Well known methods can be used to build test sequences for test or verification once sets V and T are known.

At 208, the method selects a state ($S_{start}$) from the set of reachable states that have not yet been explored (set F). As the method explores the state space of the ASM, states will be added (via step 218) and removed (via step 212) from set F.

At 210, the method determines whether any transitions exist in set R that exit the state $S_{start}$ selected at step 208. If no new transitions are available that exit the state selected at 208, then that state is removed at step 212 from set F.

At 214, the method removes the determined transition 210 from set R and adds the transition to set E. In this example, a transition ($S_{start}$, $R_{transition}$, $S_{end}$) comprises a start state ($S_{Start}$) an edge ($R_{Transition}$), and a state where the transition terminates ($S_{end}$).

At 216, the method compares $S_{end}$ to the states in set V. Set V is a set of states that starts with state $S_0$ and comprises output states when the method exits 206. At step 216, if $S_{end}$ includes a variable-value assignment combination for a state grouping (e.g., $G_1$ or $G_2$) that is not already in set V, then at step 218 the (1) transition selected at 214 is added to set T, the (2) state $S_{end}$ is added to state V, and the (3) state $S_{end}$ is added to state F. The method then returns to step 204. However, if $S_{end}$ includes a variable-value assignment combination for a state grouping (e.g., $G_1$ or $G_2$) that is already in set V, then nothing is added to sets V, F, or T, and the method returns to step 204.

Optionally, at step 216, a bound ($B_i$) is provided for one or more state groupings or for one or more specific value assignments to one or more state groupings. The bound is supplied (e.g., step 202) by a user to create a more directed state exploration. If a bound greater than 1 is added for any state grouping or any specific variable-value assignment within a state grouping, then step 218 is allowed to be performed until set V and T have the multiple states or transitions indicated by the associated bound.

Exemplary System of State Exploration Using State Groupings

Figure 3:
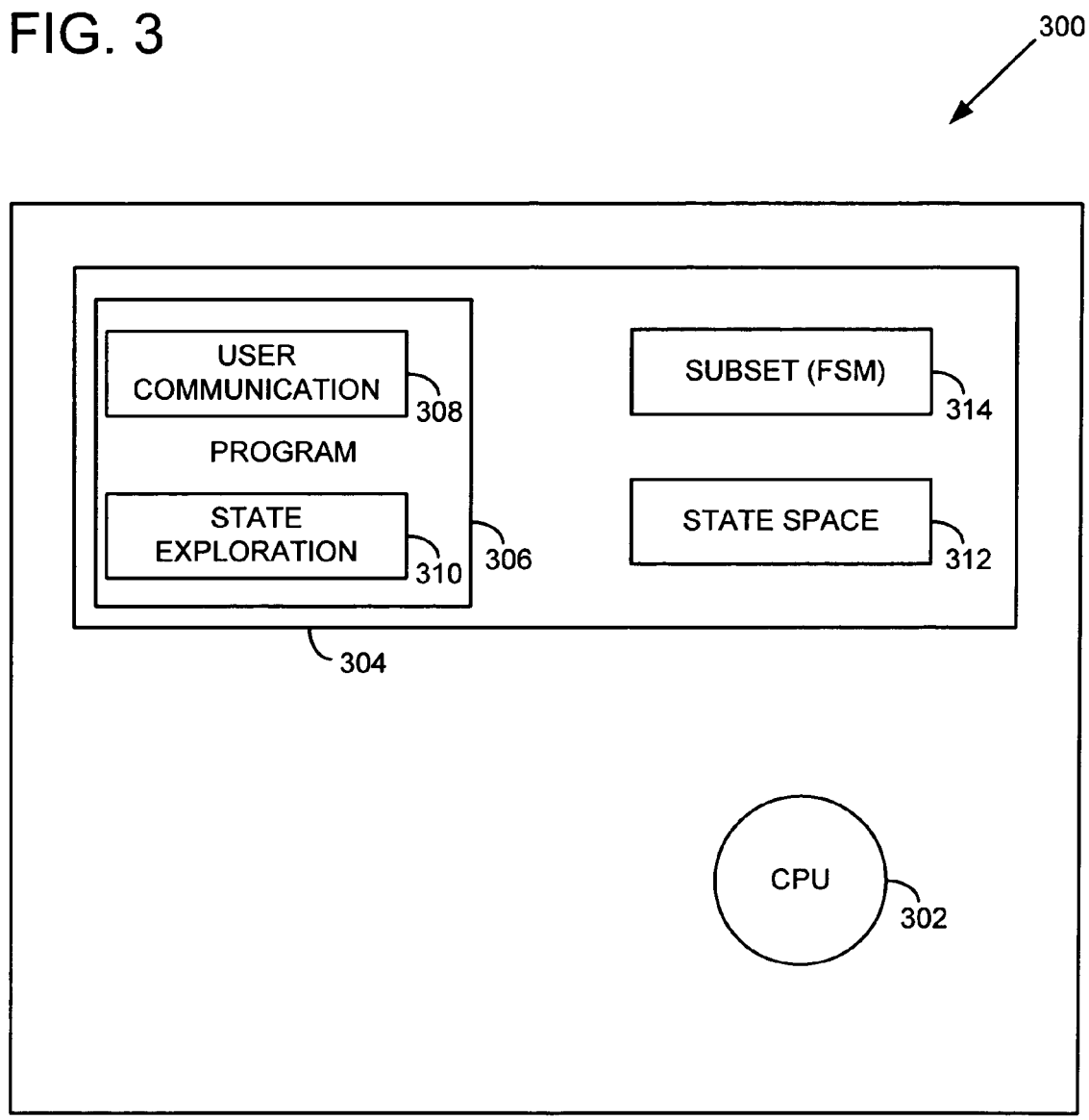
FIG. 3 is a block diagram of an exemplary system for exploring a state space with plural state groupings.

FIG. 3 is a block diagram of an exemplary system for exploring a state space for plural state groupings.

The computer system 300 includes a central processing unit (CPU) 302 and memory 304. The memory includes a program 306, comprising a user communication component 308, a state exploration component 310, and a state space 312 (such as a model program, device states, abstract state machine, finite state machine, program, etc.). Optionally, after the program is run, a subset of the state space (e.g., FSM, table, test sequence, etc.) is located in memory 314.

The user communication component receives the state space and state groupings. In one example, the user communication component generates a graphical user interface, and the state space is received in the form of a model program, and the received state groupings identify plural state grouping tuples.

The state exploring component receives the state space and the state groupings and returns a subset of the state space. In one such example, a finite transition system is a set of transitions (e.g., set T). In one such example, transitions in a set T comprises tuples of the form—(State, Transition, State). In another example, the finite transition system comprises a set of states and a set of transitions between states.

In one example, the state exploring component explores the state space and provides a subset of the state space comprising a transition set T. In one such example, the exploring component selects states from a frontier set and performs certain steps until the frontier set is empty. When the frontier set is empty, the subset of the state space is output. In one example, set V of the output includes states of the subset, and set T includes transitions of the subset.

In one example, when a state is selected from the frontier set, if the selected state provides a transition to an unexplored state, and the unexplored state provides a variable-value assignment corresponding to at least one of the received plural state groupings that is not yet presently in set V, then the unexplored state is added to the frontier set and to set V, and the transition is added to set T. However, when a state is selected from the frontier set and that state provides only transitions already explored, then that state is removed from the frontier set.

In another example, a bound is provided for state groupings or for specific variable-value assignments within a state grouping. In one such example, when a state selected from the frontier set provides a transition to a state with a variable-value assignment corresponding to at least one of the plural state groupings that is already in set V but set V has not yet reached the associated bound, then the state with the variable-value assignment is added to the frontier set and to set V, and the transition is added to set T.

In another such example, when a state selected from the frontier set provides a transition to a state with a specific variable-value assignment corresponding to at least one of the plural state groupings that is already in set V but set V has not yet reached the associated bound, then the state with the specific variable-value assignment is added to the frontier set and to set V, and the transition is added to set T.

Exemplary Definitions of State Groupings

Figures 8, 9:
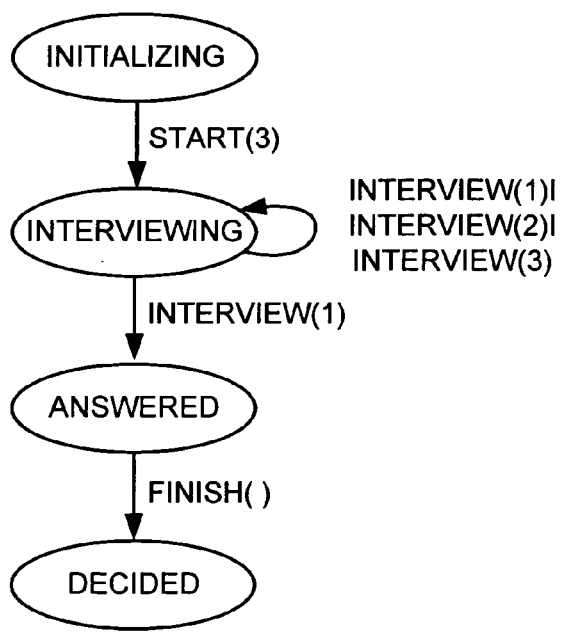

Definitions are provided in order to clarify state exploration using state groupings. In another example, a model program and state groupings comprise inputs to a method or system. FIGS. 4-8 provide a program listing of an exemplary model program used to illustrate state exploration using state groupings. The exemplary model program is written in a specification language called "Spec#"® from Microsoft Corporation. FIG. 4 is an exemplary definition of a mapping of state variables to values. Such a mapping of state variables to values is also called a first-order structure or an ASM state. FIGS. 6-8 are program listings of exemplary actions of a model program. An action is also known as a method. FIGS. 7 and 8 are program listings of exemplary action invocations that further comprise fixed parameter values, "int n" and "Prisoner p", respectively.

A precondition of a method m is a Boolean expression using parameters of m and state variables. An invocation $m(v_1, \ldots, v_n)$ is enabled in a given state s, if the precondition of m holds in s. In the exemplary model program, an invocation is enabled if certain requires conditions (e.g., 604) are true. A model program P induces a (possibly infinite) labeled transition system (LTS) $(s_0, S, L, R)$ as described in Table A.

TABLE A $s_0$ is the initial state given by the initial values of all variables in P,
S is the set of all reachable (enabled) states (reachable from the initial state of the model through invocations),
L is the set of all labels (a, o) where a is an invocation and o is a return value of executing a,
$R \subseteq S \times L \times S$ is the smallest transition relation that contains all (s, (a, o), t) such that a is enabled in the source state s, and executing a in s yields the return value o and the target state t.

A grouping G is a tuple $(e_1, \ldots, e_k)$ of state-based grouping expressions. The expressions identify an interesting state space and may be based on state variables occurring in P, but the act of reading the expression to determine the evolving state of P should not have any side effects (i.e. may not change any of the state variables). The value of an expression e in a state s is denoted by e(s). We write G(s) for the tuple $(e_1(s), \ldots, e_k(s))$ of values and call it the G-label of s.

Exemplary State Groupings In FSM Generation

Groupings provide a way of defining "what is an interesting state partition" from a given testing point of view. The main idea of state groupings in FSM generation is that states with the same G-label are considered to be indistinguishable with respect to G. One of the interesting insights presented here is that a tester may provide several state groupings $G_1, \ldots, G_k$, and associate each grouping $G_i$ with an integer-valued bound expression $B_i$.

The exploration algorithm described in Table B keeps a set V of states that have been visited so far, a frontier F of states that have not been fully explored yet, a set T of transitions included in the generated FSM, and a set E of transitions that have been explored.

For each grouping $G_i$ and a tuple t of values, $H_i(t)$ denotes the number of states currently in V whose $G_i$-label is t, i.e. $H_i(t) = \#\{s \in V : G_i(s) = t\}$.

The $H_i(t)$ function returns a number indicating the number of states (#) presently in set V, whose $G_i$-label is the same as input t. Thus, if t is a tuple <false, 0> in $G_2$, and one of the states in V at the time of calling the function $H_i(t=<false, 0>)$ has the tuple value <false, 0>, then the output of $H_i(t)$ is 1. If two of the states in V had the tuple values <false, 0>, then the output of $H_i(t)$ would be 2. Thus, $H_i(t)$ counts the number of states in V that have the same tuple values as the g-label input t. This function $H_i(t)$ is helpful in determining whether or not a proposed transition and its associated state should be selected for adding to a finite state machine. For example, if a proposed transition to state t, has no new variable assignments that help explore the relevant variables for the selected state groupings, then the proposed state t is not added to the finite state machine or the resulting test sequence.

Initially T=E={} and V=F={$s_0$}, and the algorithm of Table B is repeated until set F is empty.

TABLE B

A state s is chosen from set F.
A transition (s,l,t) is selected and removed from R and added to E, or if no such transition exists, i.e. if there are no unexplored transitions from s, then s is removed from F.
If, t is not already in V and for some $G_i$, $H_i(G_i(t)) < B_i(t)$, then add transition (s,l,t) to T, and add state t to V and F.

The exploration algorithm of Table B emphasizes the use of multiple state groupings. In the actual algorithm implemented in Spec Explorer, there are several other conditions that need to be taken into account and that affect the overall outcome of the exploration.

The third statement (i.e., If, t is not already in V and for some $G_i$, $H_i(G_i(t))<B_i(t)$, then . . . ) in Table B helps determine what states and transitions will be returned in an output finite state machine in sets V and T. For example, $H_i(G_i(t))$ asks the question, for state t (i.e., in (s,l,t)) and for state grouping $G_1$, how many states in set V already have the same value assignments to the $G_1$ grouping as does state t? $B_1(t)$ is a bounding function determines how many states the user wants of the t value assignments. $H_i(G_i(t))$ checks each user provided state grouping and compares it to state t. Thus, if t provides a desirable addition to the state exploration (e.g., a new or desirable repeat variable-value assignment combination for any of the user provided state groupings $G_{j=1...n}$), then t is added to set V, and (s,l,t) is added to set T.

For example, if the following conditions hold:
1. $G_1$ is the state grouping <A, B>,
2. State t=(<A=5, B=3, C=dog, D=red>),
3. $B_1(G_1)$=1, and
4. Set V=[($S_0$=<A=5, B=2, C=dog, D=red>), ($S_1$=<A=5, B=1, C=dog, D=red>)], then state t will be added to set V since there are "zero" variable-value assignments in set V that explore the <A=5, B=3> assignment of state t. In this example, the statement $H_1(G_1(t))$=0 indicates that set V has zero $G_1$ variable-value assignments equal to the $G_1$ variable-value assignments of state t. Additionally, since a bound of one is requested on the $G_1$ grouping (i.e., $B_1(t)$=1), the equation $H_1(G_1(t))<B_1(t)$ evaluates to true. Note that state t is checked with respect to each of the state groupings ($G_{i=1...n}$). If state t provides a state exploration for set V that has not yet reached the desirable bound for at least one grouping ($H_i(G_i(t))<B_i(t)$), then state t will be added to V and F, and the transition (s,l,t) will be added to T. Bounds can be provided for state groupings (i.e., three of all possible <A, B> variable-assignment combination) and or for individual variable-value assignments within a state grouping (i.e., three of this specific variable-value assignment <A=3, B=2>).

The use of multiple state grouping is a powerful extension of a prior approach using a single hyperstate (GTSASM). Assume that the state variables in the model program are $v_1, \ldots, v_n$. For any two distinct variables $v_i$ and $v_j$ form the grouping $G_{ij}=(v_i,v_j)$ with $B_{ij}$=1. Thus two states s an t have the same $G_{ij}$-label if $v_i(s)=v_i(t)$ and $v_j(s)=v_j(t)$. Running the exploration algorithm with these groupings yields a state space where all pairwise combinations of variable values are present but not necessarily all states. Notice that a single grouping G=<v1, . . . ,vn> would not reduce the state space at all since all states would have distinct G-labels. This is an example showing that using multiple state groupings can result in fewer states than a comparable single state grouping.

Exemplary Prisoner Counting Game

A model program is used to demonstrate exploration of state groupings expressed in terms of a multi-agent game of a warden, prisoners, and a prisoner observer.

This example illustrates how multiple state groupings can reduce the number of test cases needed to cover the desired configurations of state variables. In this case the state groupings help reduce the size of the explored state space to be linear in relation to the number of prisoners, whereas, full exploration of the state space would otherwise grow exponentially with the number of prisoners.

State groupings for the exemplary variables are indicated in Table C. A state exploration of this counting problem explores the state space of enabled assignments to groupings $G_1$, $G_2$, and $G_3$.

TABLE C

Warden state: $G_1$ = <NInterviewed( )>
Prisoner state: $G_2$ = <signal, nCounted>
Control state: $G_3$ = <mode>

In this example, $G_3$ is a tuple containing a variable <mode>, $G_1$ is a tuple containing the variable <NInterviewed>, and $G_2$ is a tuple containing two variables <signal, nCounted>. In order to explore distinguishable states represented by these three state groupings, the variables (i.e., mode, NInterviewed, signal, and nCounted) of these state groupings are explored. For example, the state grouping defined by the $G_2$-label <signal, nCounted> has five distinct reachable tuple variable assignments (i.e., <false, 0>, <true, 0>, <false, 1>, <true, 1>, and <false, 2>). Exploring a $G_2$ state grouping would involve traversing a set of states that include variables with these five distinct variable assignments. Similarly, exploring a $G_3$ state grouping involves traversing a set of states that include variables with three distinct variable assignments (i.e., <Initializing>, <Interviewing>, and <Answered>) and a $G_1$ state grouping involves traversing a set of states with four distinct state groupings (i.e., <0>, <1>, <2>, and <3>). It would appear that three states would be required to explore $G_3$, five states would be required to explore $G_2$, and four states would be required to explore $G_1$. In all, twelve states would be required to explore this state space. However, methods and systems are provided for exploring in fewer states.

In this example, a model program provides n prisoners 602 and a prison warden. The warden chooses (e.g., [action] 702) one prisoner per day to be interviewed privately by drawing from a hat containing the names of all prisoners. During the interview the prisoner is asked "Have all of the prisoners been interviewed yet?" The prisoner may say yes 704 or remain silent. If a prisoner doesn't answer, he is sent back to his cell. If a prisoner answers correctly 802, then all prisoners go free; however, an incorrect answer results in the execution of all n prisoners.

Before the first interview occurs, the prisoners are allowed to get together as a group to devise a strategy. Then they are isolated from each other and the interviews begin. The prisoners know of a light switch by the warden's door. They can observe the state of this switch (on or off) when they are interviewed 706 and can change it on their way back to their cell. The prisoners know that the light switch is initially "off" prior to the first interview and that the warden never touches the switch. Is there a strategy the prisoners can to use to guarantee their freedom?

Exemplary Prisoner Strategy

The prisoners divide themselves into one observer 502 and n−1 signalers 504. The signalers perform the following action whenever they are interviewed: if the light switch is off 706, they turn it on one time 708 (in other words, if they have not already done so in a previous interview). Otherwise they don't alter the state of the switch. The observer, whenever he is called in for an interview, checks the state of the switch 710. If it is on he adds one to a total he keeps in his head and sets the switch to "off". When the count in the leader's head reaches n−1, he knows that all of his fellow prisoners have been interviewed. At this point, he answers yes to the question 704, and the prisoners are freed.

Exemplary State Encoding

An exemplary solution to the prisoner counting problem can be encoded as an abstract state machine with the state shown in FIG. 4. Additionally, several other state probing methods are introduced for convenience as shown in FIG. 5. The methods of FIG. 5 answer the questions below in Table D.

TABLE D

| |
| --- |
| How many prisoners are there? |
| How many prisoners have been interviewed? |
| How many prisoners have sent signals so far? |
| Is prisoner p the chosen observer? |
| Is prisoner p one of the signalers? |
| Has prisoner p previously sent a signal? |

Exemplary Actions

As encoded in FIGS. 6-8, there are three actions that move the model program (i.e., game) forward, Start(n=3), Interview(p=1, 2, or 3) and Finish( ). Any sequence of enabled invocations (i.e., actions with arguments where the conditions given by the "require" statements are satisfied) is a valid run of the game. The game ends when there are no enabled actions. The Start(n) action 600 corresponds to a prisoners' strategy meeting, where they choose an observer (prisoner 1=observer) 502 and make a count of the number of prisoners 602 (e.g., n=3). The Interview(p) action 700 represents each occurrence of an interview. If the prisoner being interviewed is the observer and the switch has been set 710, then the observer increments his count and resets the switch. If the observer determines that all of the observers have given a signal (there will n−1 of these), then he gives the answer 704 to the warden (i.e., mode=mode.Answered). If the prisoner being interviewed is a signaler who has not previously given his signal AND the there is no previous signal pending 706, then the prisoner sets the signal 708. Finally, the warden observes that the prisoner has been interviewed 712. The knowledge about whether all prisoners have been interviewed is used to decide the outcome of the game 804.

Exemplary Model Program Run

Figure 1:
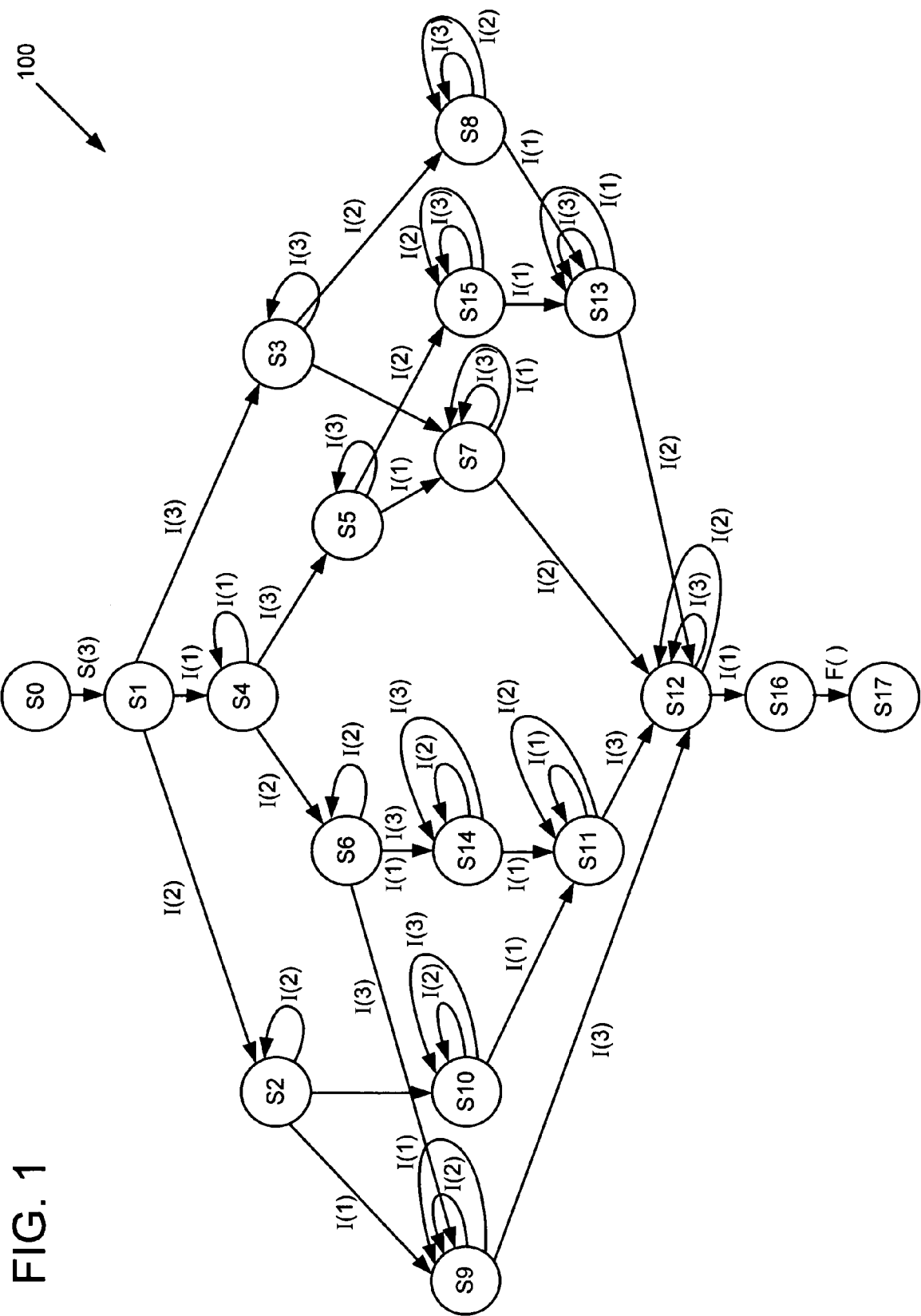
FIG. 1 is a prior art graphical representation of a finite state machine created using a specified model program.

In an exemplary model program run the number of prisoners is set at three (i.e., Start(3)). A state exploration of the model program using prior known methods produces the finite state machine (FSM) shown in FIG. 1, with 47 transitions among 17 distinct states. The FSM encodes all possible traces of the system as paths from the initial state $S_0$ to the end state $S_{17}$. The number of possible traces is infinite, and also the maximum number of steps in a given trace has no limit. However, as known in the arts, the FSM given above can still be used to generate test sequences that cover all transitions. For example, it takes 8 test sequences that begin in $S_0$ and end in $S_{17}$, with a total of 79 steps, to cover every transition given in the state machine. In FIG. 1, the symbols S(3), I(1), I(2), I(3), and A( ) represent actions Start(3), Interview(1), Interview(2), Interview(3), and Answer ( ), respectively.

Exemplary Graphical Projections of State Groupings

Using the state groupings defined selected above in Table C, the FSM shown in FIG. 1 is projected into various state groupings.

FIG. 9 is a graphical projection of a first state grouping. For example, if mode is considered an interesting program control phase indicator, then an exploration of the mode variable provides interesting "state grouping" for program testing or verification. Thus, projecting the 17 distinct states of the FSM of FIG. 1 into the four distinct states of the mode state grouping, provides a FSM shown in FIG. 9. Other possible groupings for exploring program behavior are provided in Table C.

Figure 10:
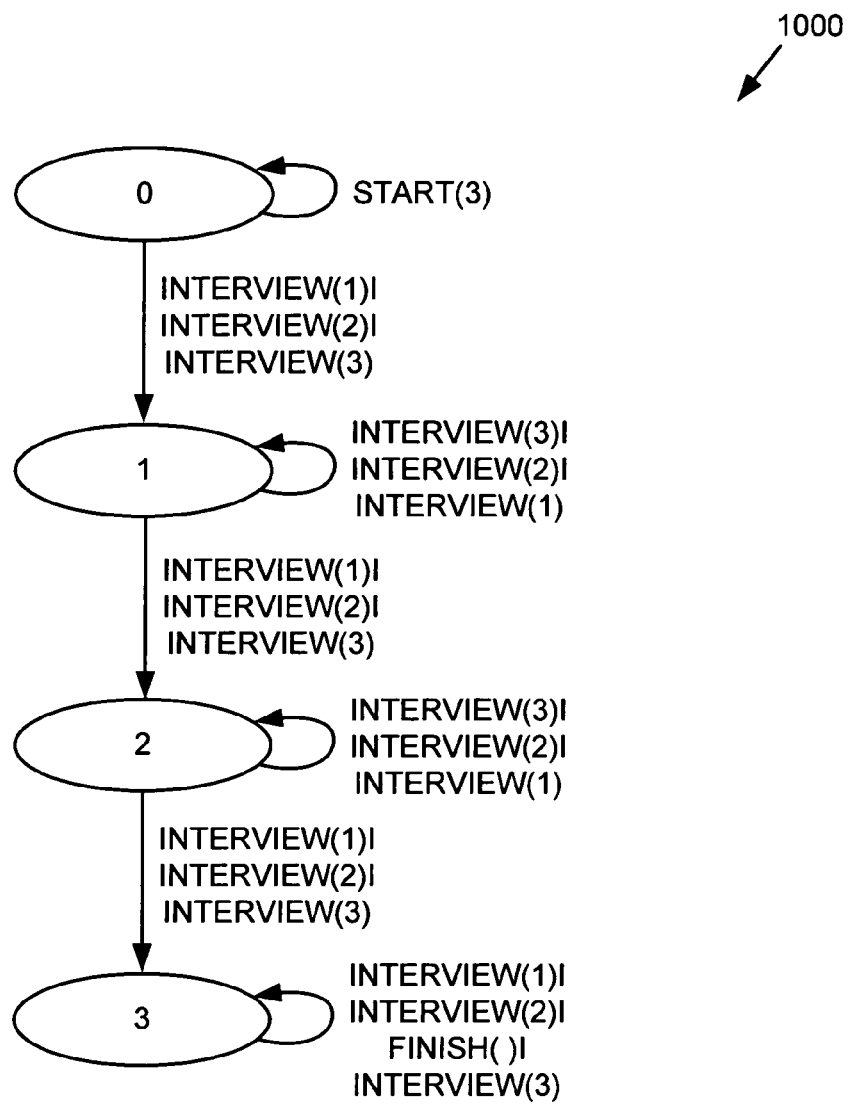
FIG. 10 is a graphical projection of an exemplary second state grouping.

FIG. 10 is a graphical projection of a second state grouping.

Figure 11:
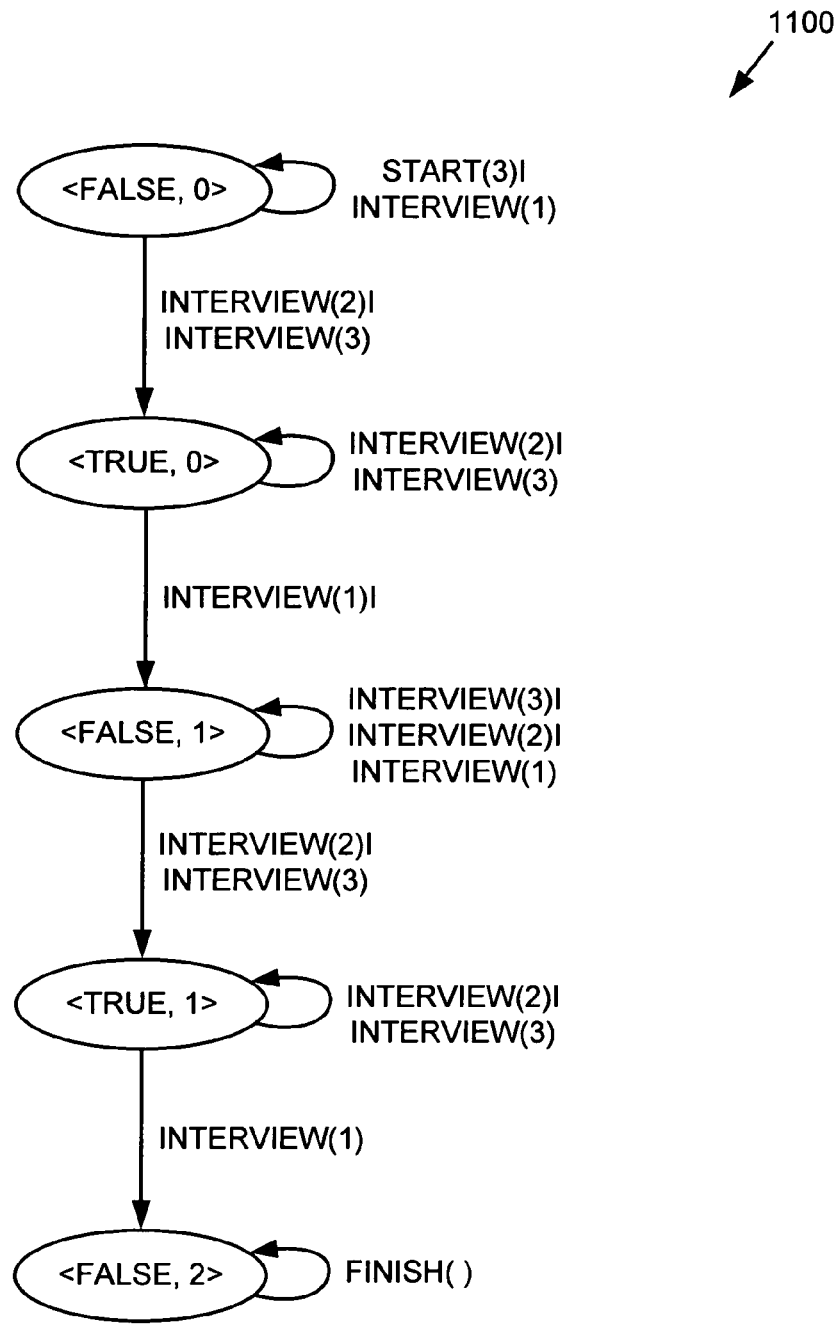
FIG. 11 is a graphical projection of an exemplary third state grouping.

FIG. 11 is a graphical projection of a third state grouping.

As with FIG. 9, FIGS. 10 and 11 are representations of single state grouping as projected from the FSM of FIG. 1.

Figure 12:
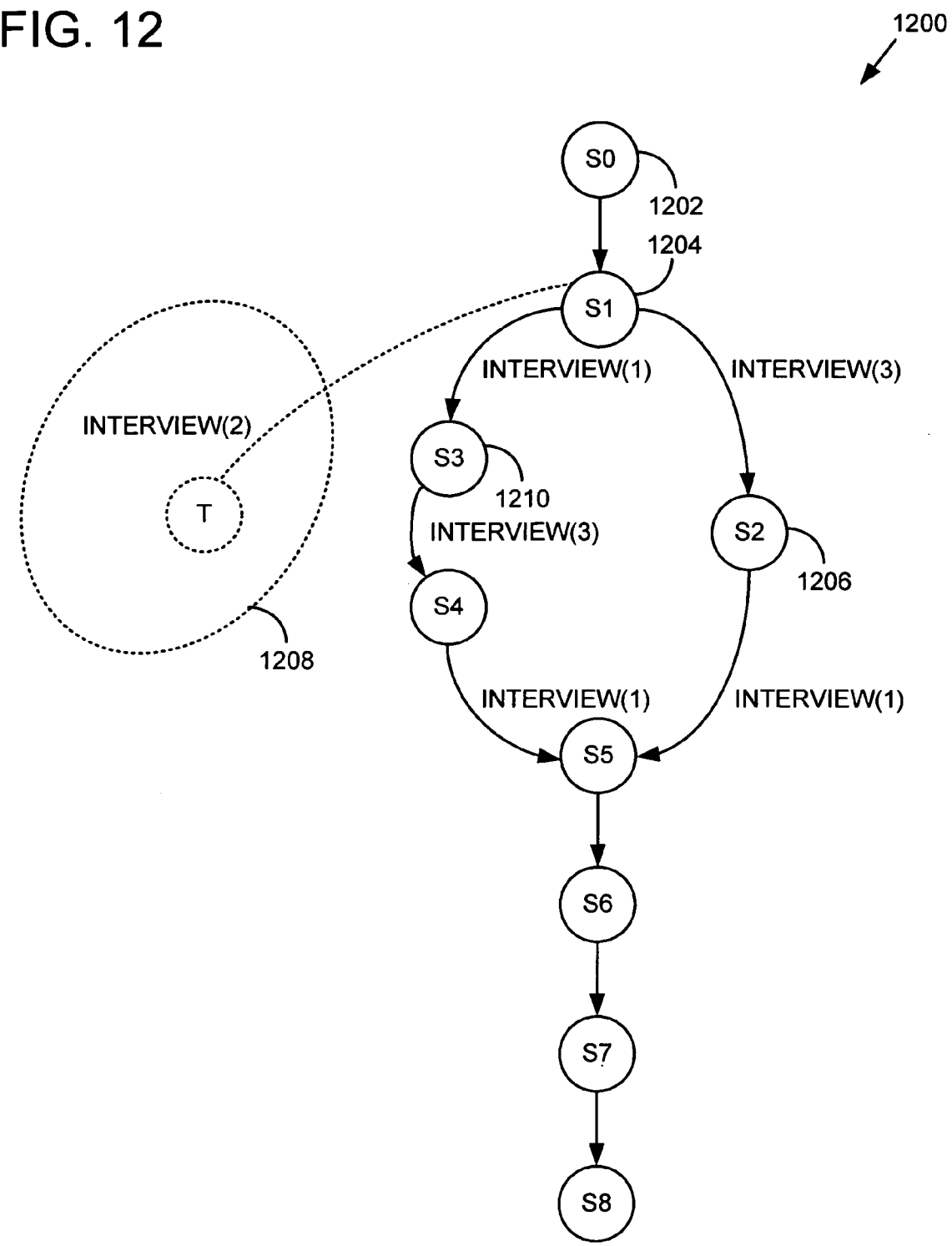
FIG. 12 is a graphical representation of a state exploration created using the multiple state groupings of FIGS. 9-11.

FIG. 12 is a graphical representation of state exploration using the multiple state groupings defined above in Table C, namely, $G_1$, $G_2$ and $G_3$. The FSM shown in FIG. 12 is advantageous because it contains fewer states and transitions than the FSM of FIG. 1. However, FIG. 12 includes the projections of $G_1$, $G_2$ and $G_3$, as shown in FIGS. 9-11. In this example, as the number of players ("prisoners") increases, the full FSM (FIG. 1) grows exponentially while the FSM created with state groupings (FIG. 12) grows linearly.

A smaller FSM in general that provides coverage identified by plural provided state groupings, reduces the number of test sequences and or the number of steps in a test sequence thereby providing better scalability during testing. For example, the FSM of FIG. 12 requires only 2 test sequences from $S_0$ to $S_8$, with 15 total transitions. Thus, in this example, a directed behavioral coverage is provided with fewer steps than FIG. 1, which requires at least 8 test sequences with a total length of at least 79 steps. The tests derived from both FSMs (i.e. from FIG. 1 and FIG. 12) cover all of the states of the projection FSMs of FIGS. 9, 10, and 11. Yet, the FIG. 12 result is achieved with many fewer steps by using multiple state groupings for exploration. Since state spaces are much larger in more typical devices and software under test, a reduced test sequences with directed coverage becomes even more valuable.

Exemplary Method State Exploration Trace

Tables E-J provide an exemplary state for a partial trace of the model program using the method of state exploration with state grouping described in Table B. The inputs are the model program and the state groupings of Table C. In this example, a bound is set at 1 for all state groupings (i.e., $B_1(G_1)=B_2(G_2)=B_3(G_3)=1$).

As previously discussed, the method begins initialized according to FIG. 4 as shown in Table E.

TABLE E

Set V=[ $S_0$ ], Set F=[ $S_0$ ], Set T = [ ], Set E = [ ]
<mode=Initializing, prisoners [ ], signal = false, NInterviewed = 0, nCounted = 0>

As stated in Table B, the method selects a state from set F. At this early stage, only $S_0$ can be selected. Next, the method selects a transition that exits selected state $S_0$. Since mode=Initializing, the only action that is enabled from $S_0$, is the Start(3) action 606. Thus, the Start(3) action is the only action that exits the selected state $S_0$. The Start(3) action is represented by the transition ($S_0$, Start(3), t), which is a specific representation of the generic transition (s,l,t) shown in Table B. In this transition (s,l,t), state $S_0$ corresponds to s, Start(3) corresponds to 1, and state t corresponds to t. In order to determine whether or not state t should be added to set V, the question is asked, does state t provide a variable-value assignment for any of the state groupings in Table C, that is not yet present (i.e., bound=1 in this example) in set V (i.e., If, for some $G_i$, $H_i(G_i(t)) < B_i(t)$, then add transition (s,l,t) to T).

If the proposed transition Start(3) were taken from state $S_0$, then the following state changes would occur (i.e., 602, 608): <mode=Interviewing, prisoners [1, 2, 3]>.

The $G_1$ state grouping of state t is <NInterviewed=0>, the $G_2$ state grouping of state t is <signal=false, nCounted=0> and the $G_3$ state grouping of state t is <mode=Interviewing>. Each grouping is then compared to the states already in set V to determine whether state t provides a desirable variable-value assignment not yet present in set V. Presently, set V has only the $S_0$ state, and thus set V presently provides the $G_1$ state grouping of $S_0$ of <NInterviewed=0>, the $G_2$ state grouping of $S_0$ of <signal=false, nCounted=0> and the $G_3$ state grouping of $S_0$ is <mode=Intitializing>. When comparing state t to the sets already present in set V, it is apparent that state t has the same variable-value assignments as $S_0$ for state groupings $G_1$ and $G_2$. However, state t contains a variable-value assignments of the $G_3$ state grouping that is not already present in set V, namely <mode=Interviewing> is not present in any state in set V (i.e., $H_3(G_3(t))=0$). Since the bound in this example is 1 for all state groupings (i.e., $B_3(t)=1$), the statement $H_3(G_3(S_1)) < B_3(S_1)$ evaluates to true. Thus, as required by Table B, state t is renamed $S_1$ and is added to set V and set F, and the transition ($S_0$, Start(3), $S_1$) is added to set T. Table F represents the new state of the method after these changes.

TABLE F

Set V=[$S_0$,$S_1$], Set F=[$S_0$,$S_1$], Set T = [($S_0$, Start(3), $S_1$)], Set E = [($S_0$, Start(3), $S_1$)]
<mode=Interviewing, prisoners [1,2,3], signal = false, NInterviewed = 0, nCounted = 0>

Upon adding state $S_1$ to set V and F, and adding transition ($S_0$, Start(3), $S_1$) to set T, a resulting exemplary graphical representation of sets V and T is represented by items 1202, 1204 of FIG. 12.

The method next returns to the first step—state is chosen from set F. As shown in Table F, set F now contains two states $S_0$ and $S_1$. Assume that state $S_0$ is selected from set F. Next, the method selects a transition that exits selected state $S_0$. However, since there are no more unexplored transitions that exit $S_0$ (i.e., transition ($S_0$, Start(3), $S_1$) is now in the explored transitions set E), there are no more explored transitions of $S_0$ from F. Thus, state $S_0$ is removed from set F (but remains in set V). Thus, the state is updated as shown in Table G, before ending this iteration and returning to select another state from set F.

TABLE G

Set V=[$S_0$,$S_1$], Set F=[$S_1$], Set T = [($S_0$, Start(3), $S_1$)], Set E = [($S_0$, Start(3), $S_1$)]
<mode=Interviewing, prisoners [1,2,3], signal = false, NInterviewed = 0, nCounted = 0>

Once again, the method selects a state from set F. As shown in Table G, only set $S_1$ remains in set F to be selected. Next, the method selects a transition that exits selected state $S_1$ and adds the transition to set E. Since mode=Interviewing 714, the only action that is enabled from $S_1$, is the Interview (p) action 702. Assuming three is selected as a parameter, the Interview(3) transition is selected to exit state $S_1$. In order to determine whether state t should be added to set V, the question is asked (i.e., $H_i(G_i(t)) < B_i(t)$), does state t provide a variable-value assignment for any of the state groupings, that has not yet present in set V? If the proposed transition Interview(3) were taken, then the following state changes would occur (i.e., 708, 712): <signal=true, NInterviewed =1>.

The $G_1$ state grouping of state t is <NInterviewed=1>, the $G_2$ state grouping of state t is <signal=true, nCounted=0>and the $G_3$ state grouping of state t is <mode=Interviewing>. Each grouping is then compared to the states already in set V to determine whether state t provides a desirable variable-value assignment of state groupings not yet present in set V. In this case, state t provides several variable-value assignments not yet present in set V, namely, $G_1$ <NInterviewed=1> and $G_2$ <signal=true, nCounted=0>. In this case, $H_i(G_i(t)) < B_i(t)$ is true for $i=1$ and $2$. Thus, state t is named state $S_2$, and is added to FIG. 12 as item 1206. Additionally, $S_2$ is added to sets V and F, and transition ($S_1$, Interview(3), $S_2$) is added to set T. Table H provides the resulting altered state.

TABLE H

Set V=[ $S_0$,$S_1$,$S_2$ ], Set F=[$S_1$,$S_2$], Set T = [($S_0$, Start(3), $S_1$), ($S_1$, Interview(3), $S_2$)], Set E = [($S_0$, Start(3), $S_1$), ($S_1$, Interview(3), $S_2$)]
<mode=Interviewing, prisoners [1,2,3], signal = true, NInterviewed = 1, nCounted = 0>.

Once again, the method selects a state from set F. As shown in Table H, states $S_2$ and $S_1$ remain in set F to be selected. In this example, the method selects state $S_1$. Next, the method selects a transition that exits selected state $S_1$ and adds the transition to set E. Since mode=Interviewing 714, the only action that is enabled from $S_1$, is the Interview(p) action 702. Assuming two is selected as a parameter this time, the Interview(2) transition is selected to exit state $S_1$, and this transition is added to set E. In order to determine whether state t should be added to set V, the question is asked (i.e., $H_i(G_i(t)) < B_i(t)$), does state t provide a variable-value assignment for any of the state groupings, that has not yet present in set V? If the proposed transition Interview(2) were taken from state $S_1$, then the following state changes would occur (i.e., 708, 712): <signal=true, NInterviewed=1>. However, these are the same changes that occurred when transition ($S_1$, Interview(3), $S_2$) was selected to exit $S_1$.

In this case, state t provides no new variable-value assignments not already present in set V. In this case, $H_i(G_i(t)) < B_i(t)$ is false for $_{i=1, 2\ and\ 3}$. Thus, state t is not added to set V, and no transition is added to set T. However, as shown in Table I, transition ($S_1$, Interview(2), t) is in set E so it won't need to be explored again later. As shown in FIG. 12, this manifestation of state t exiting state $S_1$ is not included 1208 in the output FSM even though it is a valid transition of the model program. This transition and state do not further explore state spaces defined by the state groupings, so they are not added to sets V or T.

TABLE I

Set V=[ $S_0,S_1,S_2$], Set F=[$S_1,S_2$], Set T = [($S_0$, Start(3), $S_1$), ($S_1$, Interview(3), $S_2$)], Set E = [($S_0$, Start(3), $S_1$), ($S_1$, Interview(3), $S_2$), ($S_1$, Interview(2), t)]
<mode=Interviewing, prisoners [1,2,3], signal = true, NInterviewed = 1, nCounted = 0>.

Once again, the method selects a state from set F. As shown in Table I, only states $S_1$ and $S_2$ remains in set F to be selected. In this example, the method selects state $S_1$. Next, the method selects a transition that exits selected state $S_1$ and adds the transition to set E. Since mode=Interviewing 714, the only action that is enabled from $S_1$, is the Interview (p) action 702. Assuming one is selected as a parameter, the Interview(1) transition is selected to exit state $S_1$. In order to determine whether state t should be added to set V, the question is asked (i.e., $H_i(G_i(t)) < B_i(t)$), does state t provide a variable-value assignment for any of the state groupings, that has not yet present in set V? If the proposed transition Interview(1) were taken, then the following state changes would occur (i.e., 718, 720, 712): <signal=false, nCounted=1, NInterviewed=2>.

The $G_1$ state grouping of state t is <NInterviewed=2>, the $G_2$ state grouping of state t is <signal=false, nCounted=1> and the $G_3$ state grouping of state t is <mode=Interviewing>. Each grouping is then compared to the states already in set V to determine whether state t provides a desirable variable-value assignment of state groupings not yet present in set V. In this case, state t provides several variable-value assignments not yet present in set V, namely, $G_1$ <NInterviewed=2> and $G_2$ <signal=false, nCounted=1>. In this case, $H_i(G_i(t)) < B_i(t)$ is true for $_{i=1\ and\ 2}$. Thus, state t is named state $S_3$, and is added to FIG. 12 as item 1206. Additionally, $S_3$ is added to sets V and F, and transition ($S_1$, Interview(1), $S_3$) is added to set T. Table J provides the resulting altered state.

TABLE J

Set V=[$S_0,S_1,S_2,S_3$], Set F=[$S_1,S_2,S_3$], Set T = [($S_0$, Start(3), $S_1$), ($S_1$, Interview(3), $S_2$), ($S_1$, Interview(1), $S_3$)], Set E = [($S_0$, Start(3), $S_1$), ($S_1$, Interview(3), $S_2$), ($S_1$, Interview(2), t), ($S_1$, Interview(1), $S_3$)]
<mode=Interviewing, prisoners [1,2,3], signal = false, NInterviewed = 2, nCounted = 1>.

The trace can be continued to finish the FSM shown in FIG. 12. There are several possible FSM that can be created using this technique depending on the order that actions and parameters are randomly selected. But regardless of the order, the resulting FSM will typically provide the desired behavioral coverage of the plural state groupings.

Exemplary Bounds

Optionally, the received state groupings also comprise a received bound for one or more state groupings. In one example, a bound of two (2) is received for a state grouping (e.g., $B(G_1)=2$) In such an example, the exploration space will provide two of each reachable value assignment combination (e.g., two of each reachable <A, B> value assignments). In another example, a specific variable-value assignment within a state grouping is bounded. A bound for a specific value assignment within a state grouping indicates a number of manifestations of a unique value assignment for a state grouping (e.g., (allow three of <A=2, B=red>)). Thus, bounding allows an indication of one or more manifestations of distinct value assignments for a state grouping or for specific variable value assignments with a state grouping. Additionally, the method of Table B is varied trivially to provided the described bounds during the comparison of a proposed state t to the existing variable-values in set V.

Exemplary Computing Environment

Figure 13:
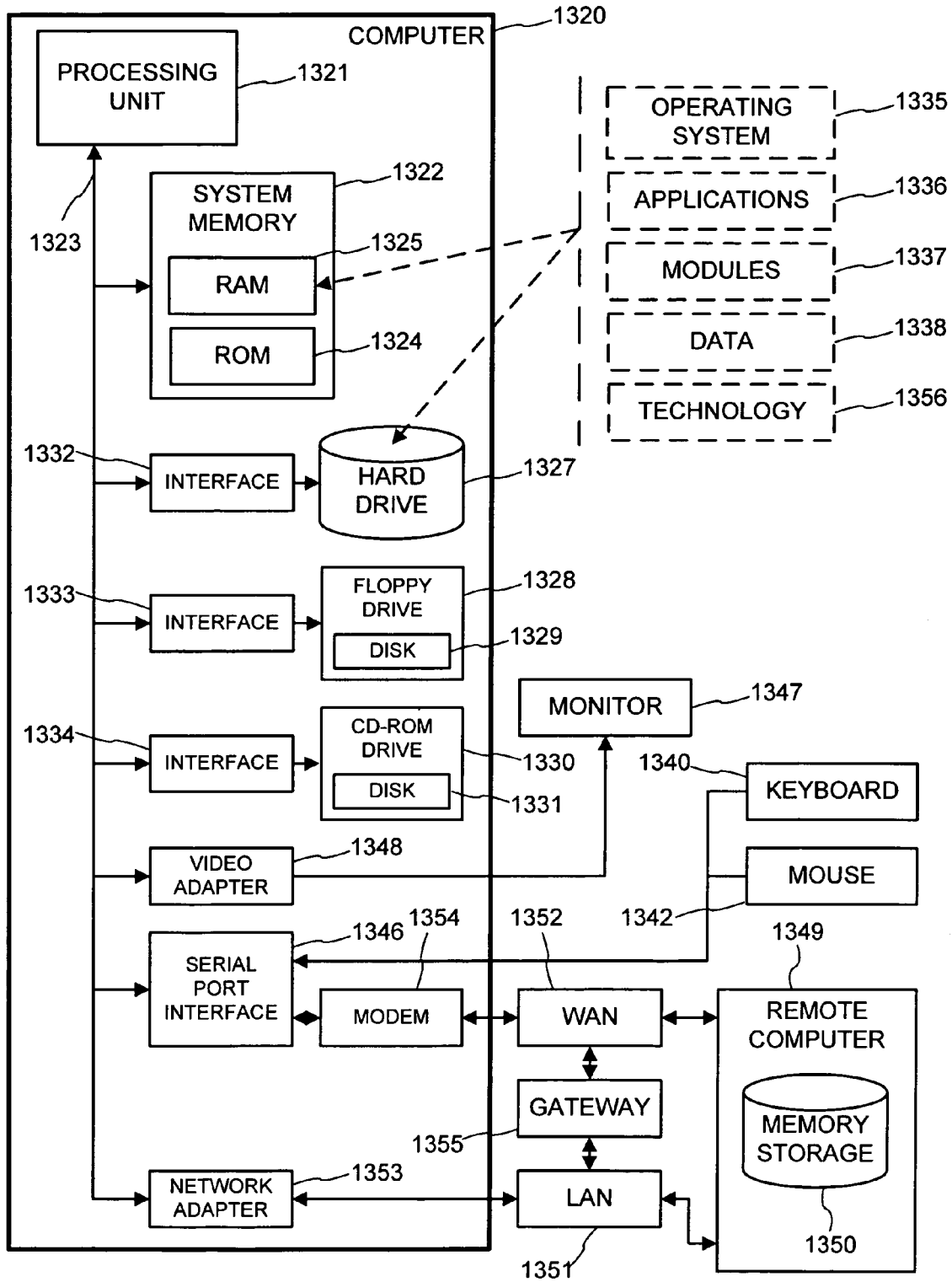
FIG. 13 is a block diagram of a computer system implementing state exploration using multiple state groupings.

FIG. 13 and the following discussion are intended to provide a brief, general description of a suitable computing environment for an implementation of state exploration using multiple state groupings. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that performs particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 13, an exemplary system for implementation includes a conventional computer 1320 (such as personal computers, laptops, servers, mainframes, and other variety computers) includes a processing unit 1321, a system memory 1322, and a system bus 1323 that couples various system components including the system memory to the processing unit 1321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1321.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1324 and random access memory (RAM) 1325. A basic input/output system (BIOS), containing the basic routines that help to transfer information between elements within the computer 1320, such as during start-up, is stored in ROM 1324.

The computer 1320 further includes a hard disk drive 1327, a magnetic disk drive 1328, e.g., to read from or write to a removable disk 1329, and an optical disk drive 1330, e.g., for reading a CD-ROM disk 1331 or to read from or write to other optical media. The hard disk drive 1327, magnetic disk drive 1328, and optical disk drive 1330 are connected to the system bus 1323 by a hard disk drive interface 1332, a magnetic disk drive interface 1333, and an optical drive interface 1334, respectively. The drives and their associated computer-readable media provide nonvolatile storage of data, data structures, computer-executable instructions, etc. for the computer 1320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1325, including an operating system 1335, one or more application programs 1336, other program modules 1337, and program data 1338; in addition to an implementation of the described methods and systems of providing state exploration with state groupings 1356.

A user may enter commands and information into the computer 1320 through a keyboard 1340 and pointing device, such as a mouse 1342. These and other input devices are often connected to the processing unit 1321 through a serial port interface 1346 that is coupled to the system bus, but may be connected by other interfaces, such as a parallel port, game port or a universal serial bus (USB). A monitor 1347 or other type of display device is also connected to the system bus 1323 via an interface, such as a video adapter 1348. In addition to the monitor, computers typically include other peripheral output devices (not shown), such as speakers and printers.

The computer 1320 operates in a networked environment using logical connections to one or more remote computers, such as a remote computer 1349. The remote computer 1349 may be a server, a router, a peer device or other common network node, and typically includes many or all of the elements described relative to the computer 1320, although only a memory storage device 1350 has been illustrated. The logical connections depicted include a local area network (LAN) 1351 and a wide area network (WAN) 1352. Such networking environments are commonplace in offices, enterprise-wide computer networks, intranets and the Internet.

When used in a LAN networking environment, the computer 1320 is connected to the local network 1351 through a network interface or adapter 1353. When used in a WAN networking environment, the computer 1320 typically includes a modem 1354 or other means for establishing communications (e.g., via the LAN 1351 and a gateway or proxy server 1355) over the wide area network 1352, such as the Internet. The modem 1354, which may be internal or external, is connected to the system bus 1323 via the serial port interface 1346. In a networked environment, program modules depicted relative to the computer 1320, or portions thereof, may be stored in the remote memory storage device. It will be appreciated that the network connections shown are exemplary and other means of establishing a communications link between the computing devices may be used, wireless or otherwise.

Alternatives

Having described and illustrated the principles of our invention with reference to illustrated examples, it will be recognized that the examples can be modified in arrangement and detail without departing from such principles. Additionally, as will be apparent to ordinary computer scientists, portions of the examples or complete examples can be combined with other portions of other examples in whole or in part. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Techniques from one example can be incorporated into any of the other examples.

In view of the many possible embodiments to which the principles of our invention may be applied, it should be recognized that the details are illustrative only and should not be taken as limiting the scope of our invention. Rather, we claim as our invention all such embodiments as may come within the scope and spirit of the following claims and equivalents thereto.

We claim:

1. A computerized method comprising:
 receiving a state space and plural state groupings; and
 selecting states from a frontier set and performing the following until the frontier set is empty:
   when a state selected from the frontier set provides a transition to a next state, and the next state provides a variable-value assignment corresponding to at least one of the plural state groupings that is not yet in a set V, adding the next state to the frontier set and to the set V, and adding the transition to a set T; and
   when a state selected from the frontier set fails to provided an unexplored transition, removing the state from the frontier set;
 returning the set T as an output finite state machine comprising a set of tuples, wherein the first element of each tuple identifies a start state of a transition, the second element of each tuple identifies a transition, and the third element of each tuple identifies a transition end state; and
 creating test sequences from the set T.

2. The method of claim 1 further comprising returning the set T and the set V as an output finite state machine.

3. The method of claim 1, wherein a bound is received associated with a state grouping.

4. The method of claim 1, wherein a bound is received associated with a specific variable-value assignment within a state grouping.

5. The method of claim 1, wherein plural bounding types are received, a first bound is associated with a state grouping, and a second bound is associated with a specific variable-value assignment within a state grouping.

6. The method of claim 1, wherein a bound is received associated with a state grouping and the method further comprises:
 when a state selected from the frontier set provides a transition to a next state, and the next state provides a variable-value assignment corresponding to at least one of the plural state groupings that is already in the set V but has not yet reached the bound, then the next state is added to the frontier set and to the set V, and the transition is added to the set T.

7. The method of claim 1, wherein a bound is received associated with a specific variable-value assignment within a state grouping and the method further comprises:
when a state selected from the frontier set provides a transition to a next state, and the next state provides a variable-value assignment corresponding to at least one of the plural state groupings that is already in the set V but has not yet reached the bound, then the next state is added to the frontier set and to the set V, and the transition is added to the set T.

8. The method of claim 1, further comprising performing tests based on the created test sequences.

9. A computerized system comprising:
computer memory; and
a central processing unit;
wherein the computer memory has a program comprising:
a user communicating component for obtaining a state space and plural state groupings;
a state exploring component for exploring the state space and providing a subset of the state space comprising a transition set T, the exploring component comprising selecting states from a frontier set and performing the following until the frontier set is empty:
when a state selected from the frontier set provides a transition to an unexplored state, and the unexplored state provides a variable-value assignment corresponding to at least one of the plural state groupings that is not yet presently in a set V, adding the unexplored state to the frontier set and to the set V, and adding the transition to the transition set T; and
when a state selected from the frontier set provides only transitions already explored, removing the state from the frontier set;
a graphics generating component that constructs a graphical representation of the transition set T comprising a finite state machine; and
a test generating component that constructs test suites from the transition set T.

10. The system of claim 9 wherein the user communicating component obtains a bounding for a state grouping.

11. The system of claim 9 wherein the user communicating component obtains a bound for a specific variable-value assignment within a state grouping; and
the state exploring component further comprises,
when a state selected from the frontier set provides a transition to a state with a specific variable-value assignment corresponding to at least one of the plural state groupings that is already in the set V but has not yet reached the bound, then the state with the specific variable-value assignment is added to the frontier set and to the set V, and the transition is added to the set T.

12. The method of claim 9, wherein the program further comprises a testing component which performs tests based on the test sequences constructed by the test generating component.

13. A computer-readable storage medium having thereon computer-executable instructions, such that when the instructions are executed by a computer, the computer performs a method comprising:
receiving a state space and plural state groupings;
selecting states from a frontier set and performing the following until the frontier set is empty:
when a state selected from the frontier set provides a transition to a next state, and the next state provides a variable-value assignment corresponding to at least one of the plural state groupings that is not yet presently in a set V, adding the next state to the frontier set and to a set V, and adding the transition to the set T, and
when a state selected from the frontier set fails to provided an unexplored transition, removing the state from the frontier set;
returning the set T and the set V as an output finite state machine; and
constructing test sequences from the set T.

14. The computer readable storage medium of claim 13, wherein the method further comprises returning the set T as an output finite state machine comprising a set of tuples wherein the first element of each tuple identifies a start state of a transition, the second element of each tuple identifies a transition, and the third element of each tuple identifies a transition end state.

15. The computer readable storage medium of claim 13 wherein a bound is received associated with a state grouping and the method further comprises:
when a state selected from the frontier set provides a transition to a next state, and the next state provides a variable-value assignment corresponding to at least one of the plural state groupings that is already in the set V but has not yet reached the bound in the set V, then the next state is added to the frontier set and to the set V, and the transition is added to the set T.

16. The computer readable storage medium of claim 13 wherein a bound is received associated with a specific variable-value assignment within a state grouping and the method further comprises:
when a state selected from the frontier set provides a transition to a next state, and the next state provides a variable-value assignment corresponding to at least one of the plural state groupings that is already in the set V but has not yet reached the bound assigned to the specific variable-value assignment in the set V, then the next state is added to the frontier set and to the set V, and the transition is added to the set T.

17. The computer readable storage medium of claim 15 wherein a second state grouping receives a different associated bound.

* * * * *

UNITED STATES PATENT AND TRADEMARK OFFICE
CERTIFICATE OF CORRECTION

| | |
|---|---|
| PATENT NO. | : 7,363,202 B2 |
| APPLICATION NO. | : 11/040187 |
| DATED | : April 22, 2008 |
| INVENTOR(S) | : Colin L. Campbell et al. |

It is certified that error appears in the above-identified patent and that said Letters Patent is hereby corrected as shown below:

In column 1, line 54, delete "ESMs." and insert -- FSMs. --, therefor.

In column 18, line 14, in Claim 13, delete "a" and insert -- the --, therefor.

In column 18, line 15, in Claim 13, delete "the" and insert -- a --, therefor.

Signed and Sealed this
Fifteenth Day of February, 2011

David J. Kappos
*Director of the United States Patent and Trademark Office*